(12) United States Patent
Duran

(10) Patent No.: US 10,596,774 B2
(45) Date of Patent: Mar. 24, 2020

(54) DUAL MOLD REPLACE CENTER RIB

(71) Applicants: Compagnie Generale des Etablissements Michelin, Clermont-Ferrand (FR); Michelin Recherche et Technique S.A., Granges-Paccot (CH)

(72) Inventor: Harvey Duran, Loganville, GA (US)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 620 days.

(21) Appl. No.: 15/507,061

(22) PCT Filed: Sep. 1, 2014

(86) PCT No.: PCT/US2014/053627
§ 371 (c)(1),
(2) Date: Feb. 27, 2017

(87) PCT Pub. No.: WO2016/036340
PCT Pub. Date: Mar. 10, 2016

(65) Prior Publication Data
US 2017/0246824 A1    Aug. 31, 2017

(51) Int. Cl.
*B29D 30/06* (2006.01)
*B29D 30/56* (2006.01)
*B29C 33/30* (2006.01)
*B29D 30/54* (2006.01)

(52) U.S. Cl.
CPC ......... *B29D 30/56* (2013.01); *B29D 30/0606* (2013.01); *B29C 33/306* (2013.01); *B29D 2030/0612* (2013.01); *B29D 2030/544* (2013.01); *B29K 2905/02* (2013.01)

(58) Field of Classification Search
CPC ..... B29C 33/306; B29C 33/42; B29C 33/424; B29C 2037/80; B29D 30/56; B29D 2030/0612; B29D 30/0606
See application file for complete search history.

(56) References Cited

U.S. PATENT DOCUMENTS

| | | | | |
|---|---|---|---|---|
| 2,297,017 | A * | 9/1942 | Overman ........... | B29D 30/0606 425/46 |
| 4,576,559 | A | 3/1986 | Yoda et al. | |
| 4,818,203 | A * | 4/1989 | Majerus ............ | B29C 45/0003 156/125 |
| 5,340,294 | A * | 8/1994 | Kata .................. | B29C 33/10 264/219 |
| 5,709,830 | A * | 1/1998 | Triantafyllis ......... | B29C 33/306 156/96 |

(Continued)

FOREIGN PATENT DOCUMENTS

| FR | 2541624 A1 | 8/1984 |
|---|---|---|
| JP | H08103973 A | 4/1996 |
| JP | 2009184137 A | 8/2009 |

OTHER PUBLICATIONS

International Search Report and Written Opinion dated Aug. 28, 2015.

*Primary Examiner* — James P Mackey
(74) *Attorney, Agent, or Firm* — Neal P. Pierotti

(57) ABSTRACT

Assemblies and methods for fabricating one or more molded tire treads are provided along with systems for manufacturing a plurality of tread mold configurations from interchangeable elements.

13 Claims, 7 Drawing Sheets

(56) References Cited

U.S. PATENT DOCUMENTS

| | | | |
|---|---|---|---|
| 6,196,818 B1* | 3/2001 | Coleman | B29D 30/0606 |
| | | | 425/195 |
| 7,717,691 B2* | 5/2010 | Coleman | B29D 30/0629 |
| | | | 425/28.1 |
| 8,215,939 B2* | 7/2012 | Takagi | B29D 30/0606 |
| | | | 425/195 |
| 9,592,645 B2* | 3/2017 | Tanaka | B29C 33/306 |
| 2004/0108035 A1 | 6/2004 | Majumdar | |
| 2008/0305195 A1 | 12/2008 | Coleman | |
| 2011/0254185 A1 | 10/2011 | Liew | |
| 2013/0118660 A1 | 5/2013 | Gay et al. | |
| 2014/0318678 A1* | 10/2014 | Colby | B60C 23/19 |
| | | | 152/209.18 |

* cited by examiner

DUAL MOLD REPLACE CENTER RIB

TECHNICAL FIELD

The presently disclosed invention is generally directed to precured treads for application to a tire carcass and retreaded tires derived therefrom.

BACKGROUND

When tires become worn, they may be restored with new tread bands or tread layers during a retread process. Retreading is a restoration or re-manufacturing process that not only extends the service life of the tires, but also is significantly less expensive than manufacturing new tires. FIG. 1 shows an exemplary tire 10 that may be subject to retreading. Tire 10 has a tire casing 12 with a crown section 14, shoulders 16, reinforcement 18 and sidewall 20. Crown section 14 may have been buffed or otherwise worked to provide a prepared bonding surface to which a laterally extending tread 22 can be bonded (e.g., via one or more bonding layers). One or more tread elements (not shown) may be integral with tread 22 in a variety of configurations as known in the art. It is therefore understood that the configuration of tread 22 is not limited to that shown herein and that a variety of tread configurations are amenable for use with the carcass.

The manufacture of various treads is effected according to multiple processes that employ a variety of molds and presses. In some production facilities, dual molds are utilized that have two single flat molds and use a permanent center dividing ridge (or "rib"). This dual mold is cast as a single piece and is not repairable. An exemplary dual mold as known in the art is provided FIG. 2, wherein one or more dual mold segments 50 are employed to form an exemplary tread having a length extending linearly or annularly. One or more of dual mold segments 50 may be selectively arranged to form a molded tread having an outer, tire-operating side (also referred to herein as the "ground-engaging side" of the tread). The tire-operating side of the tread includes exposed surfaces that are configured to engage a ground surface upon which the tire operates (i.e., the ground-engaging side of the tread extends annularly about the tire).

It is understood that the molded tread may exhibit any one of a plurality of configurations without departing from the scope of the present disclosure. As such, each dual mold segment 50 may have a plurality of integral tread-molding elements 55 formed in each of tread molding cavities 57, 59. Tread molding elements 55 enable the selective formation of one or more tread performance features, including but not limited to one or more of sipes, ribs, patterns of ribs, grooves, traction edges, slotted shoulders, tread blocks and other features selected to impart desired performance characteristics to a tire formed with the molded tread. Each tread molding cavity 57, 59 may also be configured to receive, shape and form other portions of the tire, such as opposing tire side walls and portions thereof. Each dual mold segment 50 exhibits an exemplary tread pattern, and a person of ordinary skill in the art will appreciate that the tread pattern is not limited by the present disclosure.

Referring further to FIG. 2, each dual mold segment 50 incorporates an integral center rib 60 separating tread cavities 57, 59. As schematically depicted by FIG. 3, a center rib 60 such as that shown in FIG. 2 typically has a contact surface 60a having a top width W and a height $H_A$ that is below the mold edge height $H_M$. In such dual molds, the center rib is the weakest point of the entire mold and gets damaged even with the normal operation of the mold. During tread production, at least one platen (not shown) contacts the center rib (e.g., contact surface 60a) upon press closure, as is known in the art. The center rib is susceptible to crushing by such platen, especially when subject to repeated contact thereby (an example of such a crushed center rib is shown by rib 60' in FIG. 2). Over an extended number of cures, even following best production practices, press closure can damage a current dual mold segment beyond repair (in some cases, resulting in the loss of a costly mold and the loss of dual mold capacity for up to four months). In such circumstances, the entire mold must be replaced, thereby incurring significant temporal lapses in production and consequent financial losses.

A mold configuration is therefore demanded that accommodates in-house repair of damaged ribs and thereby reduces downtime for mold replacement.

SUMMARY

An assembly for fabricating one or more molded tire treads is provided that includes at least one dual mold segment selected from a plurality of dual mold segments. Each dual mold segment has a predetermined length, a predetermined width and a plurality of tread elements integral therewith. Each dual mold segment includes a molding floor surface within which a groove is delineated that is coextensive with the predetermined width and desirably positioned at a midsection along the predetermined length. At least one replaceable rib is also provided that is selected from a plurality of replaceable ribs and corresponds to a selected dual mold segment. Each replaceable rib has a predetermined length approximating the predetermined width of the selected dual mold segment and coextensive with a pair of opposed extents. Each replaceable rib also has a predetermined height coextensive with a contact surface that accommodates contact with a press platen and a support surface proximate an engagement surface of the groove. Assembly of at least one selected dual mold segment and a corresponding selected replaceable rib is effected by removable securement of the selected replaceable rib upon engagement of the selected replaceable rib within the groove of the selected dual mold segment.

In some embodiments, insertion of the selected replaceable rib in the groove of the selected dual mold segment delineates a pair of substantially symmetrical tread molding cavities in the dual mold segment with each tread molding cavity being suitable for molding at least a portion of a molded tread. In some embodiments, any selected dual mold segment may be interchangeable with at least one non-selected dual mold segment, and any selected replaceable rib corresponding to a selected dual mold segment may be interchangeable with at least one non-selected replaceable rib corresponding to a selected dual mold segment to provide a plurality of assemblies for fabricating one or more molded tire treads.

For some assembly embodiments, the support surface of the selected replaceable rib includes a threaded aperture that accommodates engagement with a corresponding fastener. A fastener aperture may be optionally integrated within the selected dual mold segment to ensure alignment of the fastener with the threaded aperture of the selected replaceable rib and threaded engagement therewith.

For some assembly embodiments, the assembly also includes one or more orientation indicia to ensure proper orientation of the selected replaceable rib during assembly with the selected dual mold segment. Such indicia may be selected from one or more slotted holes disposed along the engagement surface of the groove; a rib identifier provided on an extent of replaceable rib; and a mold segment identifier provided on a mold segment.

The presently disclosed invention also provides a method of fabricating one or more molded tire treads. The presently disclosed method includes providing at least one assembly for fabricating one or more molded tire treads as disclosed herein.

The presently disclosed invention also includes a system for manufacturing a plurality of tread mold configurations from interchangeable elements. The presently disclosed system includes a series of dual mold segments of various configurations with each dual mold segment having a predetermined length, a predetermined width and a plurality of tread elements integral therewith. Each dual mold segment includes a molding floor surface within which a groove is delineated that is coextensive with the predetermined width and desirably positioned at a midsection along the predetermined length. The system further includes at least one replaceable rib selected from a plurality of replaceable ribs with each replaceable rib having a predetermined length approximating the predetermined width of at least one dual mold segment and coextensive with a pair of opposed extents, and a support surface proximate an engagement surface of the groove. A series of molding stations are provided that define at least a portion of a molding sequence, with each molding station accommodating performance of at least one molding step thereat. With respect to the disclosed system, any selected dual mold segment may be interchangeable with at least one non-selected dual mold segment, and any selected replaceable rib corresponding to a selected dual mold segment may be interchangeable with at least one non-selected replaceable rib corresponding to a selected dual mold segment to provide a plurality of assemblies for fabricating one or more molded tire treads.

Other aspects of the presently disclosed apparatus will become readily apparent from the following detailed description.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION

Figure 1:
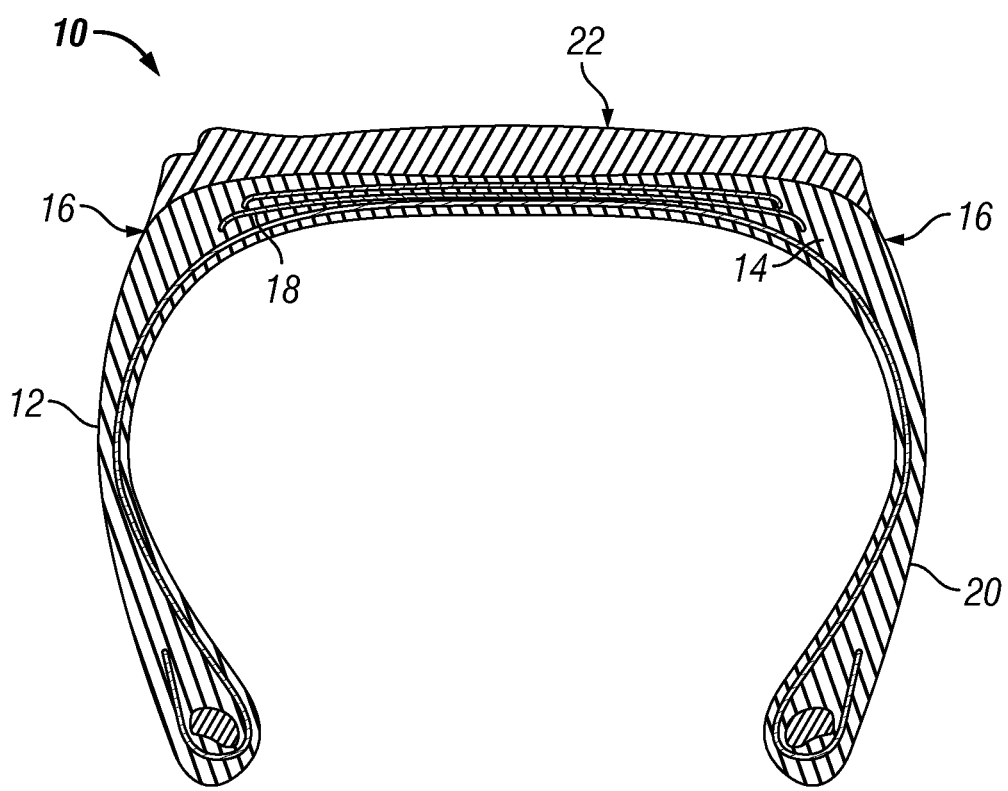
FIG. 1 shows a cross-sectional view taken laterally across a retreaded tire as known in the art.
Figure 2:
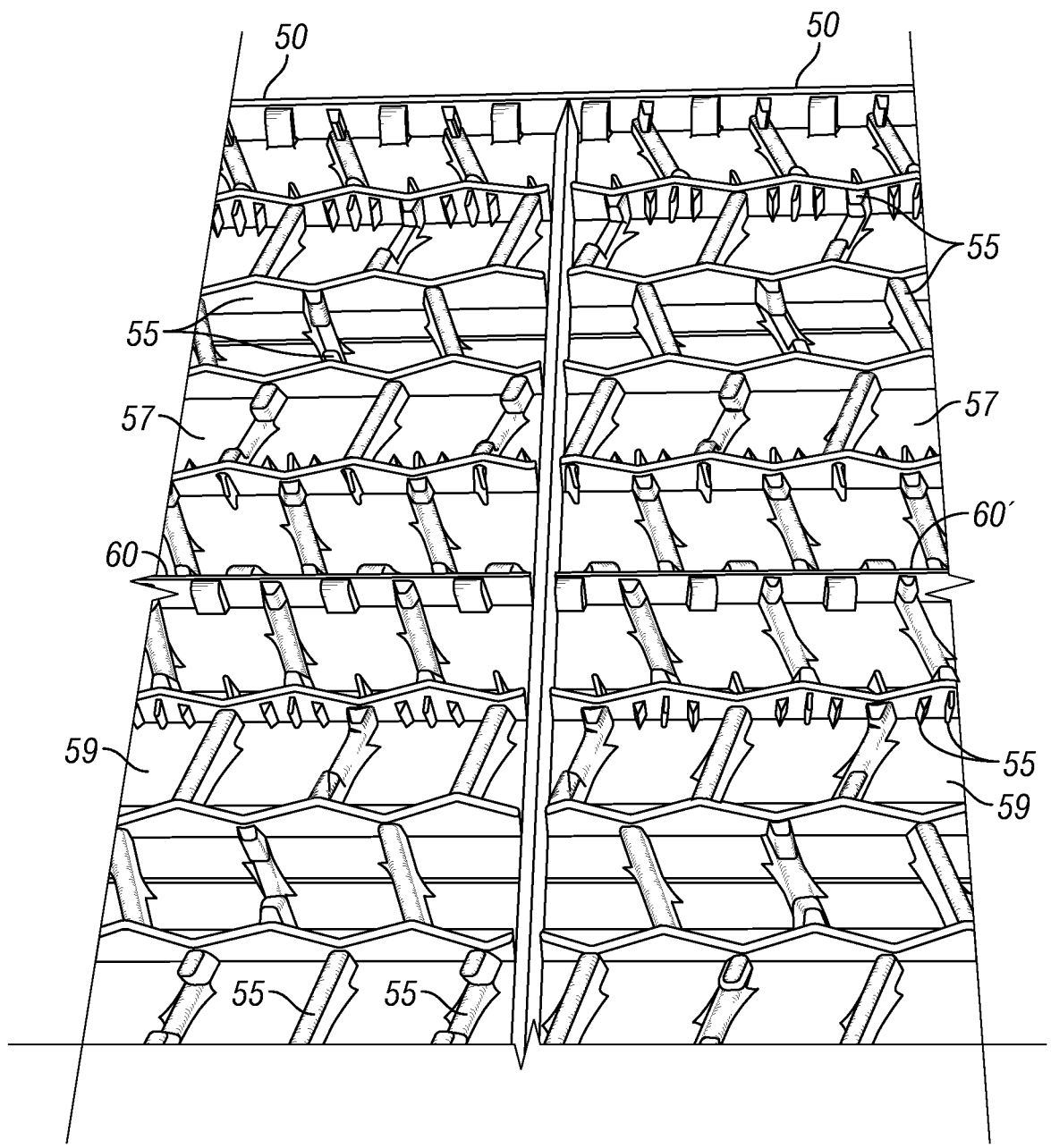
FIG. 2 shows a top view of dual mold segments as known in the art.
Figure 3:
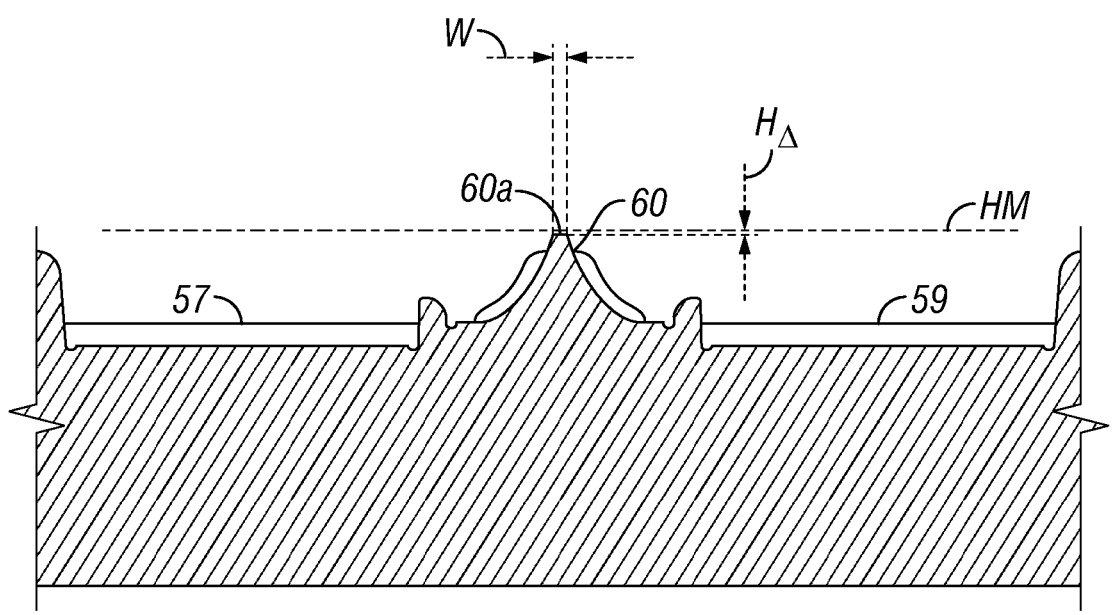
FIG. 3 shows a partial cross-sectional schematic view of a dual mold segment as known in the art.

Particular embodiments of the presently disclosed invention may be used in the production of one or more exemplary tire treads for at least one tire incorporating at least one such tread. Such tire treads may include a new tire tread that is molded prior to application to a tire carcass.

Particular embodiments of the presently disclosed invention may also be used in one or more methods for forming the abovementioned treads and tires. Particular embodiments of methods of forming a retreaded tire include applying a tire tread to a tire carcass. The tire carcass generally includes a pair of beads, a pair of sidewalls, body plies, and a belt package if the tire is a radial tire (otherwise, if not including a belt package, the tire is a biased ply tire). The body plies and belt package generally have plies of rubber containing strands of reinforcements. When retreading a tire, a used tire carcass is provided, which generally includes a cured tire having at least a portion of the old tread removed so that a new tread may be attached to the tire carcass to form a retreaded tire.

Particular embodiments of methods of forming a tire tread include forming a tread thickness bounded by a top side (also referred to as a ground-engaging side of the tread, configured to engage a surface upon which the tire operates during vehicle operation), a bottom side (configured for attachment to a tire carcass), opposing lateral sides and a groove extending into the tread thickness from the tread top side and terminating within a thickness of the tread at a groove bottom. The groove has a width defined by a pair of opposing sides and a groove bottom spaced from the bottom side of the tread by an undertread thickness. It is understood that the groove may be any type of groove having a groove bottom, where the groove is characterized as having any desired size, shape and geometry that may be employed in any desired tire tread.

Some embodiments of methods of forming a retreaded tire may include applying the tread to a tire carcass where a layer of bonding material is arranged between the tire tread and the tire carcass. During retreading operations, the tire tread (i.e., the "retread") is arranged upon the tire carcass. When the tire tread is a strip of tread, such as when molded in a flat mold, for example, the tread is wrapped around the tire carcass. When the tire tread is an annular tread band, the tread band is positioned around the tire carcass, where the tire carcass is arranged within a central opening of the tread band. When applying the tread to the tire, bonding material may be employed to attach or improve attachment of the tread to the tire carcass. For example, the bonding material may comprise any elastomeric or polymeric material, such as natural or synthetic rubber, which is curable and promotes bonding by way of cross-linking. By further example, bonding material comprising an adhesive may be arranged between the tread and the tire carcass. In particular embodiments, in performing the assembling, the bonding layer may be an uncured bonding material. It is appreciated that the bonding layer may comprise any bonding material known to one of ordinary skill used for bonding the pre-cured tire tread to a tire carcass.

Further embodiments of methods of forming a retreaded tire may include curing the tread to the tire carcass. The retread curing process is performed generally within a curing vessel (e.g., an autoclave), although it is appreciated that any known method for curing the tread to the tire carcass may be employed. The curing vessel generally includes a curing chamber providing a controlled environment in which the tire-membrane assembly is cured. Generally during the curing process, the chamber is pressurized to a desired pressure and heated to a desired temperature based upon a recipe or formula. In performing the step of curing, some embodiments of the presently disclosed invention include placing the sealed fluid chamber of the tire-membrane assembly under substantial vacuum. This generally occurs at the beginning of the curing process, before pressure and heat is applied to the tire-membrane assembly in a curing chamber of a curing vessel. As used herein, "vacuum" or "under vacuum" means providing a fluid pressure equal to zero psia (pounds per square inch absolute).

It is understood that the presently disclosed invention may also be used in one or more methods contemplated for use on tires that have previously been subject to one or more retread processes, either as disclosed herein or according to one or more other amenable retreading methods. The presently disclosed invention may be utilized in association with retreaded heavy duty truck or trailer tires and any other tire type, including but not limited to light truck, off-road, ATV, bus, aircraft, agricultural, mining, bicycle, motorcycle and passenger vehicle tires.

Figure 4:
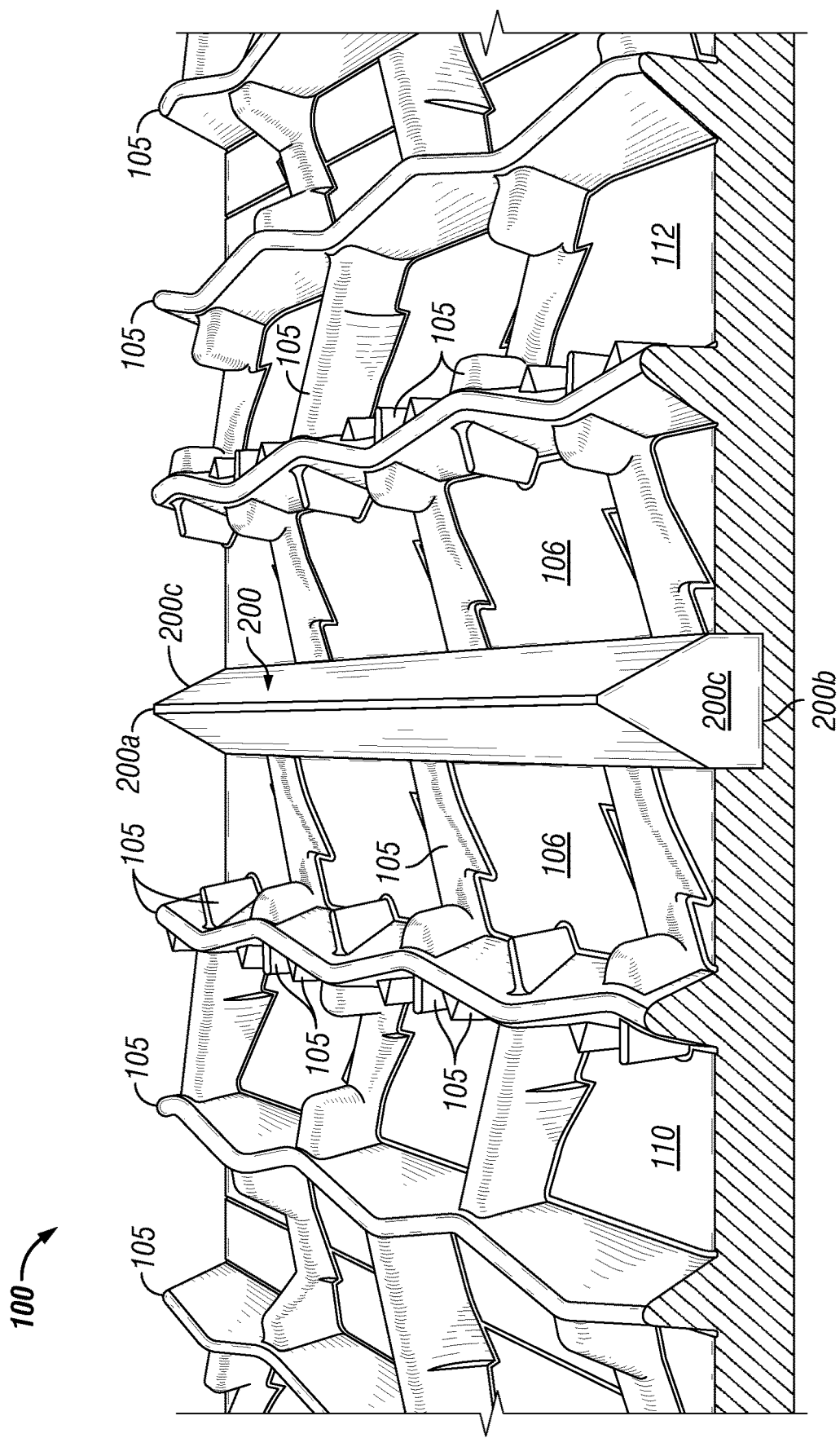
FIG. 4 shows a top perspective view of an exemplary assembly for fabricating one or more molded tire treads having a dual mold segment and a replaceable center rib.
Figure 5:
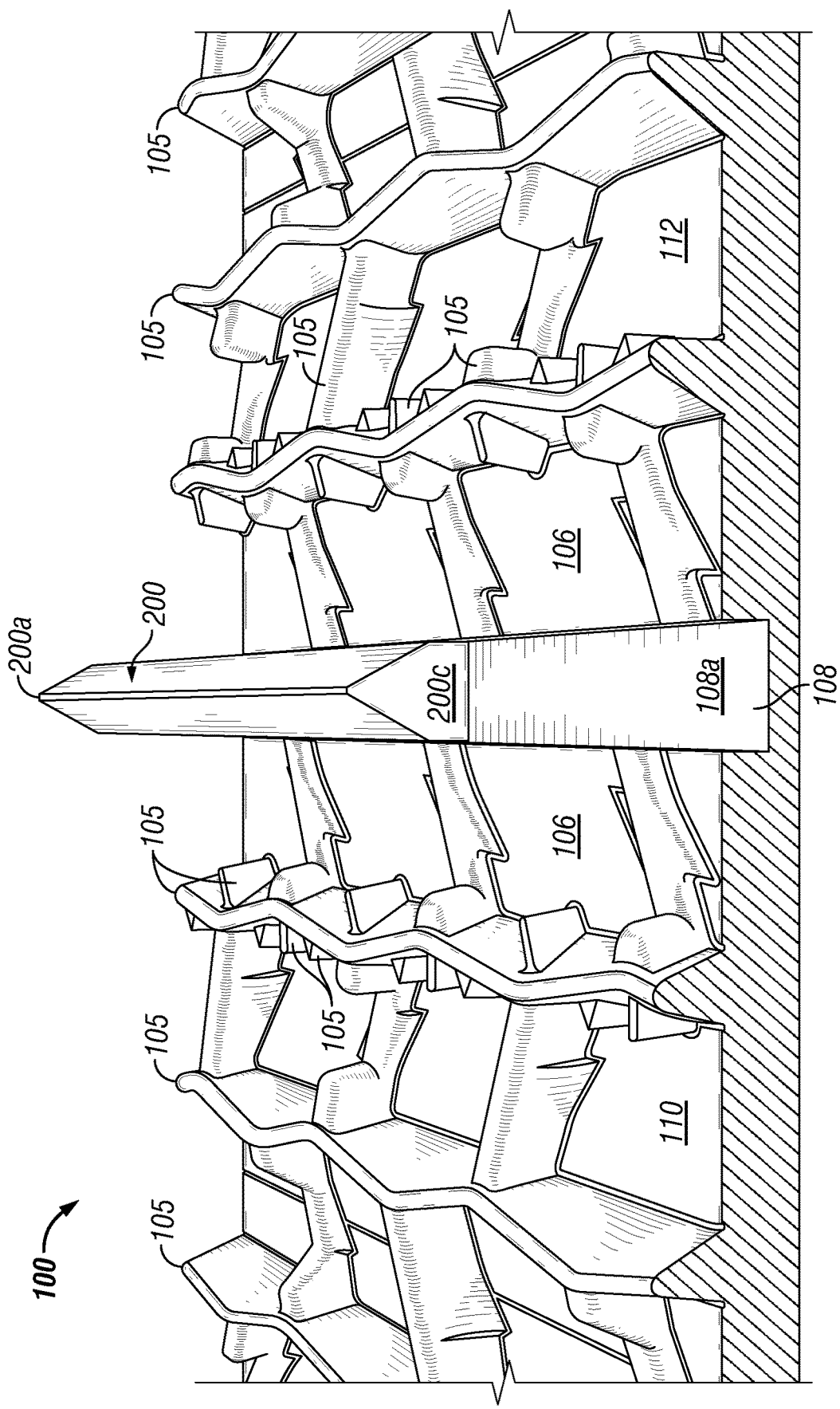
FIG. 5 shows a partial side perspective view of the exemplary assembly of FIG. 4.

Now referring to the figures, wherein like numbers represent like elements, and with particular reference to FIGS. 4 and 5, an assembly for fabricating one or more molded tire treads may include an exemplary dual mold segment 100 having a predetermined length and width to fabricate one or more exemplary treads having a length extending linearly or annularly. Dual mold segment 100 is an essentially symmetric element cast as a single member and having a plurality of tread elements 105 integral therewith. It is understood that the molded tread may exhibit any one of a plurality of configurations without departing from the scope of the present disclosure. As such, each dual mold segment 100 may have a plurality of integral tread-molding elements 105 formed therewith. Tread molding elements 105 enable the selective formation of one or more tread performance features, including but not limited to one or more of sipes, ribs, patterns of ribs, grooves, traction edges, slotted shoulders, tread blocks and other features selected to impart desired performance characteristics to a tire upon which a tread formed by dual mold segment 100 is assembled. Dual mold segment 100 exhibits an exemplary tread pattern, and a person of ordinary skill in the art will appreciate that the tread pattern is not limited by the present disclosure. It is also understood that one or more of dual mold segments 100 may be employed in the fabrication of a selected molded tread configuration.

Dual mold segment 100 includes a molding floor surface 106 within which a groove 108 is delineated. Groove 108 is coextensive with the predetermined width of dual mold segment 100 and desirably positioned at a midsection along the predetermined length thereof. Groove 108 accommodates a replaceable rib 200 that is cast as a separate member for sliding engagement with groove 108. Replaceable rib 200 has a predetermined length approximating the predetermined width of dual mold segment 100 and a predetermined height that is equal to or above a mold edge height. The predetermined height of replaceable rib 200 is coextensive with a contact surface 200a that accommodates contact with a press platen and an opposed support surface 200b. Support surface 200b of replaceable rib 200 corresponds to an engagement surface 108a of groove 108 so as to ensure removable securement of the rib before, during and in between molding operations. Each of replaceable rib 200 and dual mold segment 100 is fabricated of a suitable material for casting and machining for rubber curing, which material may be aluminum. While replaceable rib 200 is shown having a generally triangular or obelisk geometry, it is understood that such rib cross-section may assume any geometry amenable to successful operation of the presently disclosed invention.

Alignment of replaceable rib 200 with groove 108 permits ready insertion of the former within the latter. Upon insertion, replaceable rib 200 delineates the perimeters of separate tread molding cavities 110, 112, which tread cavities may be symmetrical. While each tread molding cavity 110, 112 is suitable for molding at least a portion of a molded tread, each tread molding cavity may also be configured to receive, shape and form other portions of the tire, such as opposing tire side walls and portions thereof. The predetermined length of replaceable rib 200 is defined by opposed extents 200c upon which tactile and/or visual indicia (not shown) may be disposed to ensure proper orientation of replaceable rib 200 during assembly with dual mold segment 100.

Figure 6:
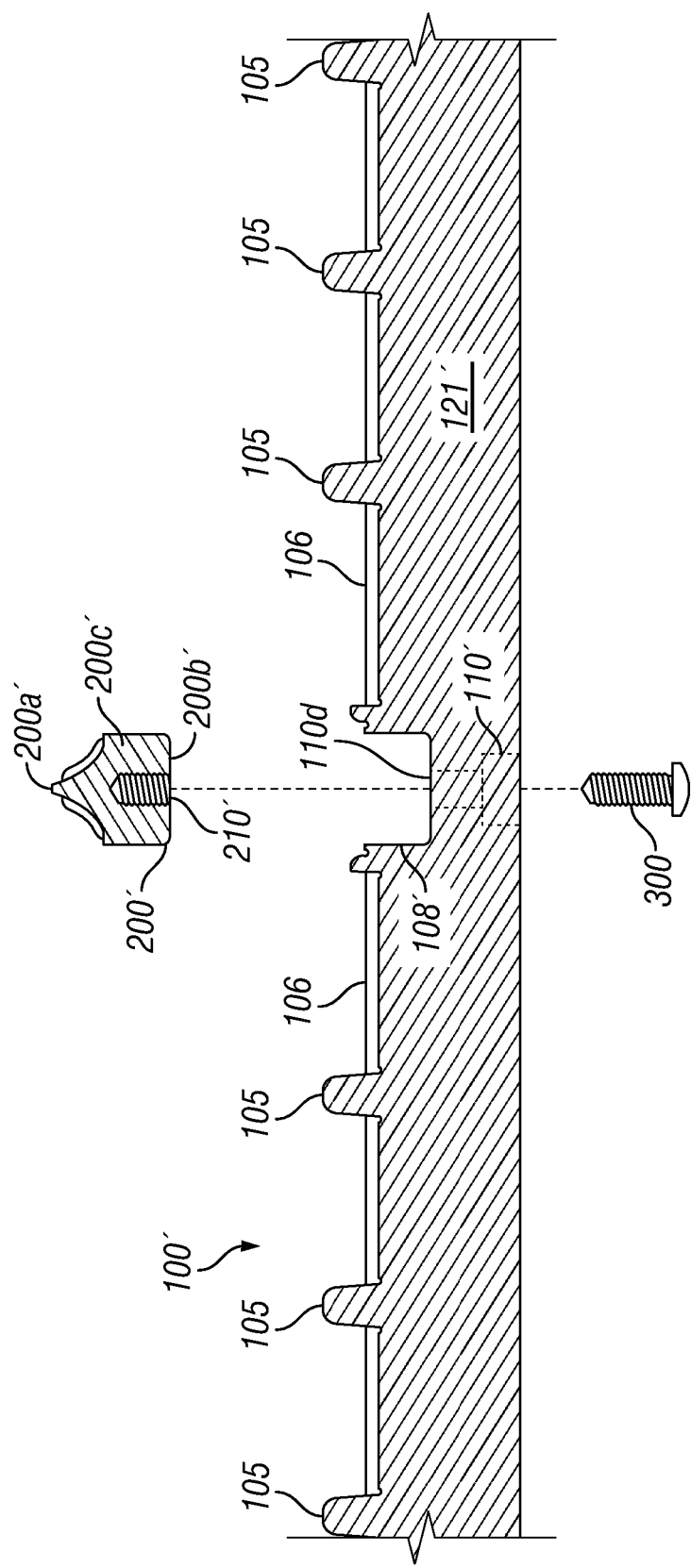
FIG. 6 shows a partial cross-sectional schematic view of another exemplary assembly for fabricating one or more molded tire treads.

Now referring to FIG. 6, wherein like numbers identify like features, another assembly for fabricating one or more molded tire treads may include an exemplary dual mold segment 100' is provided having a predetermined length and width to fabricate one or more exemplary treads having a length extending linearly or annularly. Dual mold segment 100' is an essentially symmetric element cast as a single member and having a plurality of tread elements 105 integral therewith. Dual mold segment 100' includes a molding floor surface 106' within which a groove 108' is delineated. Groove 108' is coextensive with the predetermined width of dual mold segment 100' and desirably positioned at a midsection along the predetermined length thereof. Groove 108' accommodates sliding engagement of a replaceable rib 200' having a predetermined length approximating the predetermined width of dual mold segment 100' and a predetermined height that is equal to or above the mold edge height. The predetermined height of replaceable rib 200' is coextensive with a contact surface 200a' that accommodates contact with a press platen and an opposed support surface 200b'. Support surface 200b' of replaceable rib 200b' includes a threaded aperture 210' that accommodates engagement with a corresponding fastener 300.

Figure 7:
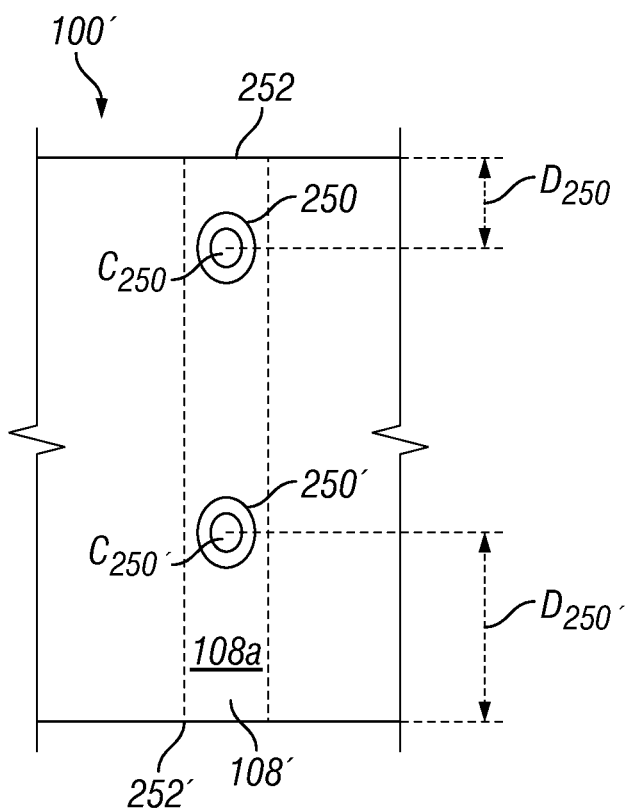
FIG. 7 shows a partial top view of the exemplary assembly of FIG. 6.

As further seen in FIG. 7, proper orientation of replaceable rib 200' with respect to a corresponding dual mold segment may be ensured by one or more indicia provided in groove 108'. Exemplary indicia may include one or more slotted holes 250, 250' disposed along engagement surface 108a of groove 108. Hole 250 has a center $C_{250}$ displaced by a predetermined distance $D_{250}$ that may be offset from an infeed segment edge 252 relative to a center $C_{250'}$ that is displaced from a segment edge 252' by a predetermined distance $D_{250'}$. Slotted holes 250, 250' provide a visual indicia that ensures predictable and repeatable alignment of threaded apertures 210' with corresponding slotted holes 250, 250'. The proper orientation and identification of the pieces are critical for a proper and accurate building process of the dual mold. Thus, the presently disclosed configuration limits the placement of replaceable rib 200' to a single orientation.

A fastener recess 110' may be integrated within dual mold segment 100' so as to ensure alignment of fastener 300 with threaded aperture 210' and thereby ensure removable securement of replaceable rib 200' relative to dual mold segment 100'. Each threaded aperture 210' may have an ingress 110a' in communication with a corresponding slotted hole 250, 250'. Although threaded engagement of the assembly is disclosed herein, it is understood that any suitable equivalent fastening structure may be employed.

Figure 8:
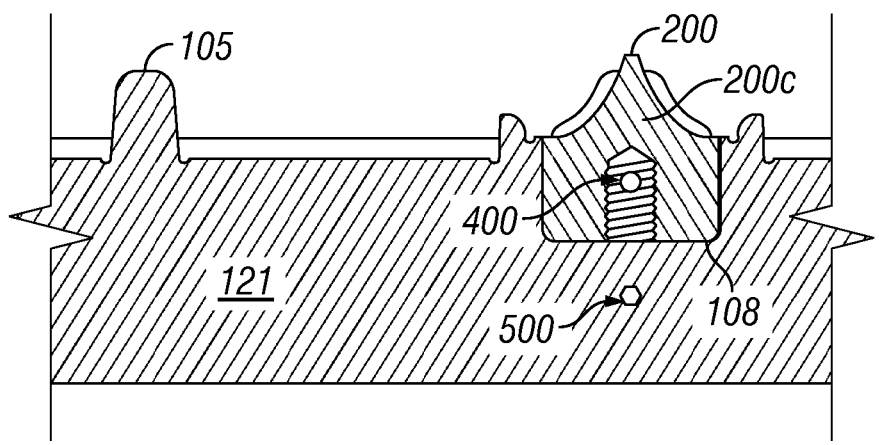
FIG. 8 shows an exemplary assembly similar to that of FIGS. 4 and 5 and incorporating exemplary orientation indices therewith.

Other tactile and/or visual indicia (not shown) may be utilized to further ensure proper orientation of the presently disclosed replaceable ribs during assembly with complementary dual mold segments. For example, referring to FIG. 8, one or more indicia 400 (e.g., an additional marking, stamping, engraving or the like) may be provided on at least one extent 200c of replaceable rib 200. Indicia 400 provides a visual indication of proper rib orientation during the process of building the dual mold assembly. An additional segment identifier 500 may be provided along a mold segment side 121 (see FIG. 6), for example proximate groove 108. The additional segment identifier may provide additional visual indicia that matches the indicia provided on the replaceable rib. It is understood that similar indicia also may be combined with other indicia as disclosed with respect to the exemplary embodiment of FIGS. 6 and 7. For example, additional indicia may be provided on at least one of rib extent 200c' and mold segment side 121' to further ensure accurate orientation and alignment of the replaceable rib with respect to the mold segment.

In operation, a platen press may repeatedly engage contact surface 200a, 200a' of respective replaceable ribs 200, 200' and inflict damage thereto. If the replaceable rib is damaged, the rib is simply unfastened and/or slidingly removed from groove 108, 108', leaving dual mold segment 100, 100' intact. Only the replaceable rib needs to be replaced, which replaceable rib may be selected from a plurality of replaceable ribs of like configuration. The replaceable rib may be pre-manufactured or readily fabricated in-house or such that dual-mold segment can be returned to production quickly. The life of dual mold segment 100, 100' is therefore extended and financial resources are conserved.

One or more of the presently disclosed assemblies for fabricating may be derived from at least one dual mold segment selected from a plurality of dual mold segments as disclosed herein. Each such dual mold segment may accommodate assembly with a replaceable rib selected from a plurality of replaceable ribs as disclosed herein. Assembly of at least one selected dual mold segment and at least one selected replaceable rib is effected by removable securement of the selected replaceable rib upon sliding engagement of the selected replaceable rib within the groove of the selected dual mold segment. In one or more associated methods of fabricating one or more molded tire treads, at least one of these assemblies may be provided. In such methods, any selected dual mold segment may be interchangeable with at least one non-selected dual mold segment, and any selected replaceable rib may be interchangeable with at least one non-selected replaceable rib. In this manner, a plurality of assemblies for fabricating tire treads becomes readily available.

It is understood that the present disclosure contemplates one or more systems for manufacturing a plurality of tread mold configurations from interchangeable elements. Each such system may include a series of dual mold segments as disclosed herein. The dual mold segments may adopt various configurations (for instance, with the incorporation of varying tread elements° to enable the production of a plurality of tire tread designs. Each such system may include at least one replaceable rib selected from a plurality of replaceable ribs as disclosed herein. A series of molding stations may be provided that defines a molding sequence with each molding station accommodating performance of at least one molding step thereat. Two or more molding stations may perform identical molding steps in accordance with current production requirements to support modularity of production capacity. Any selected dual mold segment may be interchangeable with at least one non-selected dual mold segment, and any selected replaceable rib may be interchangeable with at least one non-selected replaceable rib to provide a plurality of assemblies for fabricating molded tire treads.

The present disclosure contemplates pre-manufactured replaceable ribs for a plurality of dual mold segment configurations. One or more of such pre-manufactured replaceable ribs may be provided in a kit with one or more of at least one replaceable rib and at least one dual mold segment. The presently disclosed replaceable ribs may be pre-manufactured in small or mass quantities as needed since the overall configuration requires little lead time and the materials are readily accessible through various commercial channels. An extensive selection of interchangeable mold elements may thereby be made available that are suitable for standard and customized molds.

In this configuration, specific mold segments and their complementary ribs are readily placed into production during assembly and/or replacement. Repeat patterns in some molds will permit the exchange of complementary pieces but only on those with similar sectors or elements. Proper orientation of the ribs relative to the mold segments is therefore ensured, minimizing production down-time and eliminating the opportunity for improperly molded treads.

The terms "comprising," "including," and "having" and their equivalent terms, as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. Ranges that are described as being "between a and b" are inclusive of the values for "a" and "b."

As used herein, a "user" or an "operator" may be a single user or operator or multiple users and operators (for example, multiple users sharing use of one or more devices incorporating the presently disclosed invention). As used herein, the term "process" or "method" may include one or more steps performed at least by one user or operator. Any sequence of steps is exemplary and is not intended to limit methods described herein to any particular sequence, nor is it intended to preclude adding steps, omitting steps, repeating steps or performing steps simultaneously.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. An assembly for fabricating one or more molded tire treads, comprising:
   at least one dual mold segment selected from a plurality of dual mold segments, each dual mold segment having a predetermined length, a predetermined width and a plurality of tread elements integral therewith, with each dual mold segment including a molding floor surface within which a groove is delineated that is coextensive with the predetermined width and desirably positioned at a midsection along the predetermined length; and
   at least one replaceable rib selected from a plurality of replaceable ribs and corresponding to a selected dual mold segment, each replaceable rib having a predetermined length approximating the predetermined width of the selected dual mold segment and coextensive with a pair of opposed extents of the replaceable rib, a predetermined height coextensive with a contact surface of the dual mold segment that accommodates contact with a press platen and a support surface proximate an engagement surface of the groove;
   wherein assembly of at least one selected dual mold segment and a corresponding selected replaceable rib is effected by removable securement of the selected replaceable rib upon engagement of the selected replaceable rib within the groove of the selected dual mold segment:
   at least one orientation indicia to ensure proper orientation of the selected replaceable rib during assembly with the selected dual mold segment, wherein the at least one orientation indicia includes one or more of:
      one or more slotted holes disposed along the engagement surface of the groove;
      a rib identifier provided on one of the extents of the selected replaceable rib; and
      a mold segment identifier provided on the selected dual mold segment.

2. The assembly of claim 1, wherein insertion of the selected replaceable rib in the groove of the selected dual mold segment delineates a pair of substantially symmetrical tread molding cavities in the dual mold segment with each tread molding cavity being suitable for molding at least a portion of a molded tread.

3. The assembly of claim 1, further comprising:
   at least one non-selected dual mold segment;
   at least one non-selected replaceable rib;
   wherein any selected dual mold segment is interchangeable with the at least one non-selected dual mold segment, and any selected replaceable rib corresponding to a selected dual mold segment is interchangeable with the at least one non-selected replaceable rib corresponding to a selected dual mold segment to provide a plurality of assemblies for fabricating one or more molded tire treads.

4. The assembly of claim 1, wherein the support surface of the selected replaceable rib includes a threaded aperture that accommodates engagement with a corresponding fastener and a fastener aperture is optionally integrated within the selected dual mold segment to ensure alignment of the fastener with the threaded aperture of the selected replaceable rib and threaded engagement therewith.

5. A method of fabricating one or more molded tire treads, comprising:
   providing at least one assembly for fabricating one or more molded tire treads according to claim 1;
   providing at least one non-selected dual mold segment;
   wherein any selected dual mold segment is interchangeable with at the least one non-selected dual mold segment and any selected replaceable rib corresponding to a selected dual mold segment is interchangeable with at least one non-selected replaceable rib corresponding to a selected dual mold segment to provide a plurality of assemblies for fabricating one or more molded tire treads; and
   fabricating one or more molded tire treads.

6. The method of claim 5, further comprising inserting the selected replaceable rib in the groove of the selected dual mold segment so as to delineate a pair of substantially symmetrical tread molding cavities in the dual mold segment with each tread molding cavity being suitable for molding at least a portion of a molded tread.

7. The method of claim 5, wherein the support surface of the selected replaceable rib includes a threaded aperture that accommodates engagement with a corresponding fastener, and a fastener aperture is optionally integrated within the selected dual mold segment to ensure alignment of the fastener with the threaded aperture of the selected replaceable rib and threaded engagement therewith.

8. The method of claim 5, further comprising providing at least one of:
   one or more orientation indicia provided along the engagement surface of the groove;
   a rib identifier provided on one of the extents of the replaceable rib; and
   a mold segment identifier provided on the selected dual mold segment;
   to ensure proper orientation of the selected replaceable rib during assembly with the selected dual mold segment.

9. A system for manufacturing a plurality of tread mold configurations from interchangeable elements, comprising:
   a series of dual mold segments of various configurations, each dual mold segment having a predetermined length, a predetermined width and a plurality of tread elements integral therewith, with each dual mold segment including a molding floor surface within which a groove is delineated that is coextensive with the predetermined width and desirably positioned at a midsection along the predetermined length;
   at least one replaceable rib selected from a plurality of replaceable ribs, each replaceable rib having a predetermined length approximating the predetermined width of the at least one dual mold segment and coextensive with a pair of opposed extents of the at least one replaceable rib, and a support surface proximate an engagement surface of the groove; and
   a series of molding stations defining a molding sequence wherein each molding station accommodates performance of at least one molding step thereat;
   at least one non-selected dual mold segment;
   at least one non-selected replaceable rib;
   wherein any selected dual mold segment is interchangeable with the at least one non-selected dual mold segment and any selected replaceable rib corresponding to a selected dual mold segment is interchangeable with the at least one non-selected replaceable rib corresponding to a selected dual mold segment to provide a plurality of assemblies for fabricating one or more molded tire treads;

wherein proper orientation of the selected replaceable rib during assembly with the selected dual mold segment is effected by at least one of:

one or more orientation indicia provided along the engagement surface of the groove;

a rib identifier provided on one of the extents of the replaceable rib; and a mold segment identifier provided on the selected dual mold segment.

10. The system of claim 9, wherein insertion of a selected replaceable rib in the groove of a selected dual mold segment delineates a pair of substantially symmetrical tread molding cavities in the dual mold segment with each tread molding cavity being suitable for molding at least a portion of a molded tread.

11. The system of claim 9, wherein the support surface of a selected replaceable rib includes a threaded aperture that accommodates engagement with a corresponding fastener, and a fastener aperture is optionally integrated within the selected dual mold segment to ensure alignment of the fastener with the threaded aperture of the selected replaceable rib and threaded engagement therewith.

12. The system of claim 9, wherein two or more molding stations in the series of molding stations accommodates performance of identical molding steps in the molding sequence.

13. The system of claim 9, wherein each replaceable rib and each dual mold segment is separately cast from aluminum.

* * * * *